(12) United States Patent
Kong et al.

(10) Patent No.: US 8,452,428 B2
(45) Date of Patent: May 28, 2013

(54) METHOD AND SYSTEM FOR DETECTING AND IDENTIFYING ELECTRONIC ACCESSORIES OR PERIPHERALS

(75) Inventors: Hongwei Kong, Denville, NJ (US); Nelson Sollenberger, Farmingdale, NJ (US); Todd L. Brooks, Laguna Beach, CA (US); Yee Ling Cheung, Irvine, CA (US); Xicheng Jiang, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 1058 days.

(21) Appl. No.: 12/268,305

(22) Filed: Nov. 10, 2008

(65) Prior Publication Data

US 2010/0117685 A1 May 13, 2010

(51) Int. Cl.
G06F 17/00 (2006.01)
G06F 13/24 (2006.01)
G06F 13/32 (2006.01)
G01R 27/08 (2006.01)
H04M 1/00 (2006.01)

(52) U.S. Cl.
USPC ........... 700/94; 324/691; 455/556.1; 710/268

(58) Field of Classification Search
USPC .................. 700/94; 709/209, 237; 710/8, 10, 710/14, 260, 268; 455/556.1; 324/691
See application file for complete search history.

(56) References Cited

U.S. PATENT DOCUMENTS

| 5,214,785 | A |   | 5/1993 | Fairweather |
|---|---|---|---|---|
| 5,727,216 | A |   | 3/1998 | Takasu et al. |
| 6,161,027 | A | * | 12/2000 | Poirel ........................... 455/572 |
| 7,463,170 | B2 |   | 12/2008 | Kong et al. |
| 7,515,071 | B2 |   | 4/2009 | Kong et al. |
| 7,912,728 | B2 |   | 3/2011 | Kong et al. |
| 2005/0136848 | A1 |   | 6/2005 | Murray |
| 2007/0082634 | A1 | * | 4/2007 | Thijssen et al. ............ 455/169.1 |
| 2008/0130913 | A1 |   | 6/2008 | Kong |
| 2008/0130916 | A1 |   | 6/2008 | Kong |
| 2008/0133224 | A1 |   | 6/2008 | Kong |
| 2008/0238907 | A1 |   | 10/2008 | Wang |
| 2008/0246581 | A1 | * | 10/2008 | Irie et al. ......................... 710/15 |
| 2009/0225062 | A1 | * | 9/2009 | Naik et al. .................... 345/204 |
| 2009/0251156 | A1 | * | 10/2009 | Jasa et al. ...................... 324/704 |
| 2009/0307511 | A1 |   | 12/2009 | Fiennes et al. |
| 2010/0122005 | A1 |   | 5/2010 | Kong et al. |

OTHER PUBLICATIONS

Analog Devices, "High Definition Audio SoundMAX Codec AD1988A/AD1988B", 2006, Analog Devices, Rev. 0, All pages.*
"Four-Channel, Low-Power Audio Codec for Portable Audio/Telephony," TLV320AIC34, Burr-Brown Products from Texas Instruments, revised Nov. 2007; pp. 1-7 and 50-70.
Non-Final Rejection mailed Apr. 26, 2012 for U.S. Appl. No. 12/268,341, filed Nov. 10, 2008; 18 pages.
Notice of Allowance mailed Oct. 17, 2012 for U.S. Appl. No. 12/268,341, filed Nov. 10, 2008; 7 pages.

* cited by examiner

*Primary Examiner* — Jesse Elbin
(74) *Attorney, Agent, or Firm* — Sterne, Kessler, Goldstein & Fox, P.L.L.C.

(57) ABSTRACT

Aspects of a method and system for detecting and identifying electronic accessories or peripherals utilizing a hardware audio CODEC are provided. In this regard, a hardware audio CODEC may be operable to compare one or more voltages on one or more biased pins of an accessory or peripheral port to one or more reference voltages and generate one or more digital representations of the one or more voltages on the biased one or more pins. An accessory or peripheral attached to the accessory or peripheral port may be identified based on the comparison and/or the generated one or more digital representations. The one or more bias voltages may be controlled based on a result of the comparison and/or the generated digital representations. The one or more bias voltages may be reduced after an attached accessory or peripheral has been identified.

19 Claims, 7 Drawing Sheets

METHOD AND SYSTEM FOR DETECTING AND IDENTIFYING ELECTRONIC ACCESSORIES OR PERIPHERALS

CROSS-REFERENCE TO RELATED APPLICATIONS/INCORPORATION BY REFERENCE

This patent application makes reference to U.S. patent application Ser. No. 12/268,341 which was filed on Nov. 10, 2008.

The above stated application is hereby incorporated herein by reference in its entirety.

FIELD OF THE INVENTION

Certain embodiments of the invention relate to electronic devices. More specifically, certain embodiments of the invention relate to a method and system for detecting and identifying electronic accessories or peripherals.

BACKGROUND OF THE INVENTION

As electronic devices are increasingly relied upon to perform a growing number of functions in an increasing number of situations, improving the versatility of electronic devices has become a focus of many electronics manufacturers. One way in which the versatility and utility of electronic devices may be improved is through the use of peripheral accessories or peripherals. These accessories or peripherals may be attached and detached from the electronic devices as needed in order to customize the functions and/or use of the device. For example, smart phones may support the use of accessories or peripherals such as headsets, microphones, keyboards, and storage devices. However, although it may be desirable to support a multitude of accessories or peripherals, the number and/or types of connectors and/or ports of an electronic device may be limited by space, connectivity, and/or cost considerations.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for detecting and identifying electronic accessories or peripherals, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for detecting and identifying electronic accessories or peripherals. In various embodiments of the invention, a hardware audio CODEC may be operable to compare one or more voltages on one or more biased pins of an accessory or peripheral port to one or more reference voltages and generate one or more digital representations of the one or more voltages on the one or more biased pins. An accessory or peripheral attached to the accessory or peripheral port may be identified based on the comparison and/or the generated one or more digital representations. The comparison and generation of a digital representation may be performed for a sequence of bias points. One or more bias voltages may be applied to the one or more pins via one or more resistances. The one or more bias voltages may be controlled based on a result of the comparison and/or the generated digital representations. The one or more bias voltages may be reduced after an attached accessory or peripheral has been identified. The one or more bias voltages may be set to approximately 2.1 V prior to and/or during the identification of an attached accessory or peripheral and approximately 0.4 V subsequent to identification of an attached accessory or peripheral. Application of the one or more bias voltages may be disabled in instances that there is no accessory or peripheral attached to the accessory or peripheral port. A first range of voltages may be converted to a digital representation via a first portion of a plurality of analog to digital converters in the hardware audio CODEC and a second range of voltages may be converted to a digital representation via a second portion of the plurality of analog to digital converters in the hardware audio CODEC. Higher resolution digital representations may be generated via a first portion of a plurality of analog to digital converters in the hardware audio CODEC and lower resolution digital representations may be generated via a second portion of the plurality of analog to digital converters in the hardware audio CODEC.

Figure 1A:
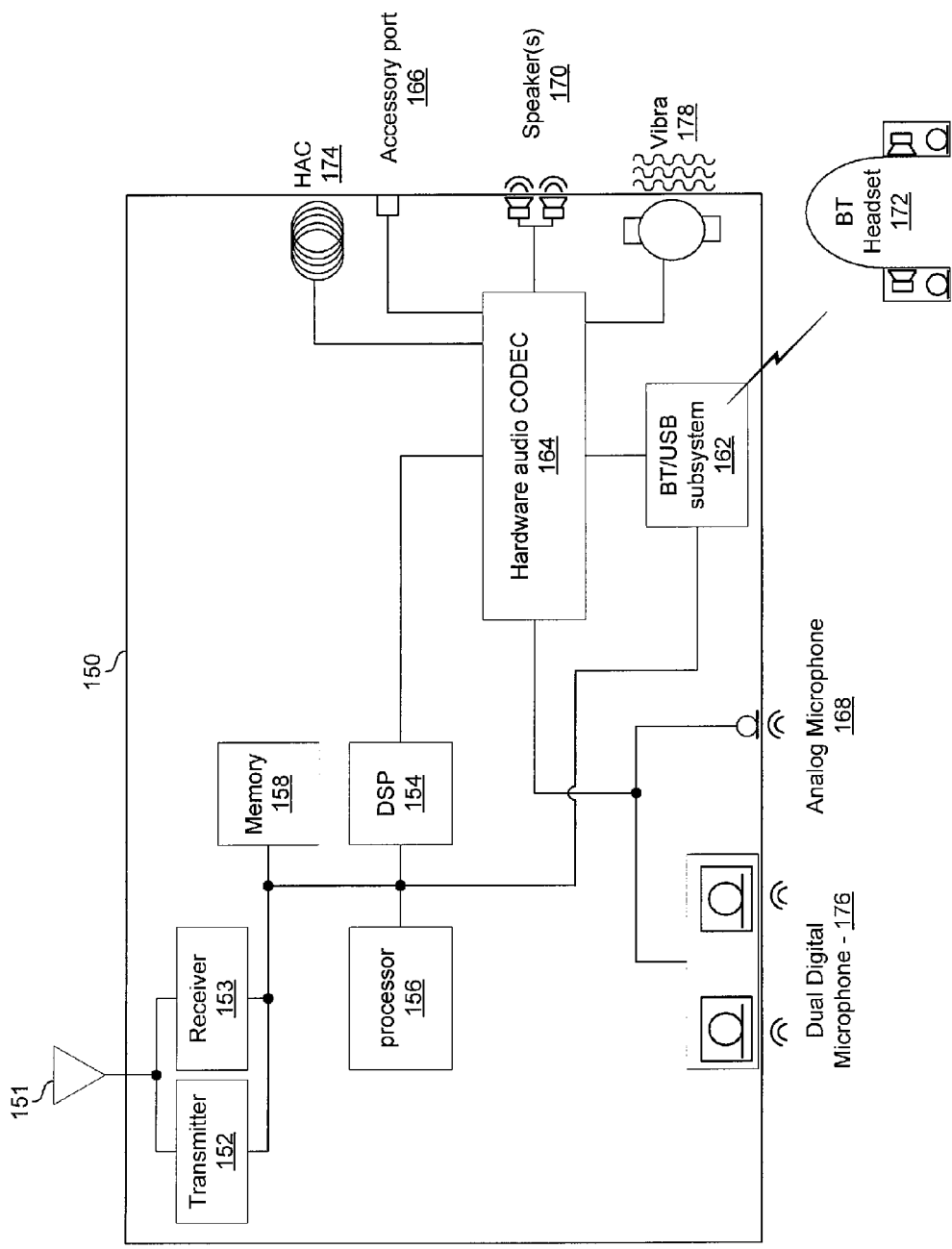
FIG. 1A is a diagram illustrating an exemplary system comprising a hardware audio CODEC enabled to detect and identify attached accessories or peripherals, in accordance with an embodiment of the invention.

FIG. 1A is a diagram illustrating an exemplary system comprising a hardware audio CODEC enabled to detect and identify attached accessories or peripherals, in accordance with an embodiment of the invention. Referring to FIG. 1A, the wireless system 150 may comprise an antenna 151, a transmitter 152, a receiver 153, a digital signal processor 154, a processor 156, a memory 158, a Bluetooth (BT) and/or universal serial bus (USB) subsystem 162, a hardware audio CODEC 164, an accessory or peripheral port 166, an analog microphone 168, speaker(s) 170, a Bluetooth headset 172, a hearing aid compatibility (HAC) coil 174, a dual digital microphone 176, and a vibration transducer 178. The antenna 151 may be used for reception and/or transmission of RF signals. Different wireless systems may use different antennas for transmission and reception.

The transmitter 152 may comprise suitable logic, circuitry, and/or code that may be operable to modulate and up-convert baseband signals to RF signals for transmission by one or more antennas, which may be represented generically by the antenna 151. The transmitter 152 may be operable to execute other functions, for example, filtering the baseband and/or RF signals, and/or amplifying the baseband and/or RF signals. Although a single transmitter 152 is shown, the invention is not so limited. Accordingly, there may be a plurality of transmitters and/or receivers. In this regard, the plurality of transmitters may enable the wireless system 150 to handle a plurality of wireless protocols and/or standards including cellular, wireless local area networking (WLAN), and personal area networking (PAN). In addition, the transmitter 152 may be combined with the receiver 153 and implemented as a combined transmitter and receiver (transceiver).

The receiver 153 may comprise suitable logic, circuitry, and/or code that may be operable to down-convert and demodulate received RF signals to baseband signals. The RF signals may be received by one or more antennas, which may be represented generically by the antenna 151. The receiver 153 may be operable to execute other functions, for example, filtering the baseband and/or RF signals, and/or amplifying the baseband and/or RF signals. Although a single receiver 153 is shown, the invention is not so limited. Accordingly, there may be a plurality of receivers. In this regard, the plurality of receivers may enable the wireless system 150 to handle a plurality of wireless protocols and/or standards including cellular, WLAN, and PAN. In addition, the receiver 153 may be implemented as a separate transmitter and a separate receiver.

The DSP 154 may comprise suitable logic, circuitry, and/or code that may be operable to process audio signals. In various embodiments of the invention, the DSP 154 may encode, decode, modulate, demodulate, encrypt, and/or decrypt audio signals. In this regard, the DSP 154 may be operable to perform computationally intensive processing of audio signals.

The processor 156 may comprise suitable logic, circuitry, and/or code that may be operable to configure and/or control one or more portions of the system 150, control data transfers between portions of the system 150, and/or otherwise process data. Control and/or data information may be transferred between the processor 156 and one or more of the transmitter 152, the receiver 153, the DSP 154, the memory 158, the hardware audio CODEC 164, and the BT and/or USB subsystem 162. The processor 156 may be utilized to update and/or modify programmable parameters and/or values in one or more of the transmitter 152, the receiver 153, the DSP 154, the memory 158, the hardware audio CODEC 164, and the BT and/or USB subsystem 162. In this regard, a portion of the programmable parameters may be stored in the system memory 158. In an exemplary embodiment of the invention, the processor 156 may be operable to identify an accessory or peripheral attached to the accessory or peripheral port 166 based on one or more signals from one or more accessory or peripheral identification modules within the system 150. The processor 156 may be any suitable processor or controller. For example, the processor 156 may be a reduced instruction set computing (RISC) microprocessor such as an advanced RISC machine (ARM), advanced virtual RISC (AVR), microprocessor without interlocked pipeline stages (MIPS), or programmable intelligent controller (PIC).

The system memory 158 may comprise suitable logic, circuitry, and/or code that may be operable to store a plurality of control and/or data information, including parameters needed to configure one or more of the transmitter 152, the receiver 153, the DSP 154, and/or the hardware audio CODEC 164. The system memory 158 may store at least a portion of the programmable parameters that may be manipulated by the processor 156. In an exemplary embodiment of the invention, the memory 158 may store information utilized to identify and/or determine the accessory or peripheral or peripheral attached to the accessory or peripheral port 166. The identity of the accessory or peripheral may provide more detailed information about the accessory or peripheral.

In an exemplary embodiment of the invention, the DSP 154 and processor 156 may exchange audio data and control information via the memory 158. For example, the processor 156 may write encoded audio data, such as MP3 or AAC audio, to the memory 158 and the memory may pass the encoded audio data to the DSP 154. Accordingly, the DSP 154 may decode the data and write pulse-code modulated (PCM) audio back into the shared memory for the processor 156 to access and/or to be delivered to the hardware audio CODEC 164.

The BT and/or USB subsystem 162 may comprise suitable circuitry, logic, and/or code that may be operable to transmit and receive Bluetooth and/or Universal Serial Bus (USB) signals. The BT and/or USB subsystem 162 may be operable to up-convert, down-convert, modulate, demodulate, and/or otherwise process BT and/or USB signals. In this regard, the BT and/or USB subsystem 162 may handle reception and/or transmission of BT and/or USB signals via a wireless communication medium and/or handle reception and/or transmission of USB signals via a wireline communication medium. Information and/or data received via a BT and/or USB connection may be communicated between the BT and/or USB subsystem 162 and one or more of the transmitter 152, the receiver 153, the DSP 154, the processor 156, the memory 158, and the hardware audio CODEC 164. For example, the BT and/or USB subsystem 162 may extract audio from a received BT and/or USB signal and may convey the audio to other portions of the wireless system 150 via an inter-IC sound ($I^2S$) bus. Information and/or data may be communicated from one or more of the transmitter 152, the receiver 153, the DSP 154, the processor 156, the memory 158, and the hardware audio CODEC 164 to the BT and/or USB subsystem 162 for transmission over a BT and/or USB connection. For example, audio signals may be received from other portions of the wireless system 150 via an $I^2S$ bus and the audio signal may be transmitted via a BT and/or USB connection. Additionally, control and/or feedback information may be communicated between the BT and/or USB subsystem 162 and one or more of the transmitter 152, the receiver 153, the DSP 154, the processor 156, the memory 158, and the hardware audio CODEC 164.

The hardware audio CODEC 164 may comprise suitable circuitry, logic, and/or code that may be operable to process audio signals received from and/or communicated to input and/or output devices. The input devices may be within or communicatively coupled to the wireless device 150, and may comprise, for example, the analog microphone 168, the stereo speakers 170, the Bluetooth headset 172, the hearing aid compatible (HAC) coil 174, the dual digital microphone 176, the vibration transducer 178 and/or one or more accessories or peripherals attached via the accessory or peripheral port 166. The hardware audio CODEC 164 may up-sample and/or down-sample audio signals to one or more desired sample rates for communication to an audio output device, to the DSP 154, and/or to the BT and/or USB subsystem 162. In this regard, the hardware audio CODEC 164 may comprise one or more decimation filters and/or sample rate converters which may be operable to down-convert a sampling frequency of one or more audio signals. Additionally, the decimation filters may be operable to adjust a gain of the down-sampled signals. The hardware audio CODEC 164 may also be enabled to handle a plurality of data sampling rate inputs. For example, the hardware audio CODEC 164 may accept digital audio signals at sampling rates such as 8 kHz, 11.025 kHz, 12 kHz, 16 kHz, 22.05 kHz, 24 kHz, 32 kHz, 44.1 kHz, and/or 48 kHz. The hardware audio CODEC 164 may be enabled to handle a plurality of digital audio inputs of various resolutions, such as 16 or 18-bit resolution, for example. The hardware audio CODEC 164 may support mixing of a plurality of audio sources. For example, the hardware audio CODEC 164 may support audio sources such as general audio, polyphonic ringer, $I^2S$ FM audio, vibration driving signals, and voice. In an exemplary embodiment of the invention, the general audio and polyphonic ringer sources may support the plurality of sampling rates that the hardware audio CODEC 164 may be enabled to accept, while the voice source may support a portion of the plurality of sampling rates, such as 8 kHz and 16 kHz. In an exemplary embodiment of the invention, the hardware audio CODEC 164 may comprise suitable logic, circuitry, and/or code operable to detect and identify an accessory or peripheral attached to the accessory or peripheral port 166. In this regard, the hardware audio CODEC 164 may comprise one or more modules similar to or the same as the analog HW 206 and the digital HW 208 as described with respect to FIG. 2.

The hardware audio CODEC 164 may utilize a programmable infinite impulse response (IIR) filter and/or a programmable finite impulse response (FIR) filter for at least a portion of the audio sources to compensate for passband amplitude and phase fluctuation for different input and/or output devices. In this regard, filter coefficients may be configured or programmed dynamically based on operations. Moreover, filter coefficients may all be switched in one-shot or may be switched sequentially, for example. The hardware audio CODEC 164 may also utilize a modulator, such as a Delta-Sigma ($\Delta\Sigma$) modulator, for example, to code digital output signals for analog processing. In various embodiments of the invention, the hardware audio CODEC 164 may be implemented in dedicated hardware.

The accessory or peripheral port 166 may enable a variety of accessories or peripherals to be attached to the wireless system 150. Exemplary accessories or peripherals which may be attached via the accessory or peripheral port 166 may comprise headsets, microphones, keyboards, and storage devices.

The analog microphone 168 may comprise suitable circuitry, logic, and/or code that may detect sound waves and convert them to electrical signals via a piezoelectric effect, for example. The electrical signals generated by the analog microphone 168 may comprise analog signals that may require analog to digital conversion before processing.

The speaker(s) 170 may comprise one or more speakers that may be operable to generate acoustic waves from electrical signals received from the hardware audio CODEC 164. In an exemplary embodiment of the invention, there may be a pair of speakers which may be operable to output acoustic waves corresponding to, for example, left and right stereo channels.

The Bluetooth headset 172 may comprise a wireless headset that may be communicatively coupled to the wireless system 150 via the BT and/or USB subsystem 162. In this manner, the wireless system 150 may be operated in a hands-free mode, for example.

The HAC coil 174 may comprise suitable circuitry, logic, and/or code that may enable communication between the wireless device 150 and a hearing aid, for example. In this regard, audio signals may be magnetically coupled from the HAC coil 174 to a coil in a user's hearing aid.

The dual digital microphone 176 may comprise suitable circuitry, logic, and/or code that may detect sound waves and convert them to electrical signals. The electrical signals generated by the dual digital microphone 176 may comprise digital signals, and thus may not require analog to digital conversion prior to digital processing in the hardware audio CODEC 164.

The vibration transducer 178 may comprise suitable circuitry, logic, and/or code that may be operable to notify a user of an incoming call, alerts and/or message to the wireless device 150 without the use of sound. The vibration transducer may generate vibrations that may be in synch with, for example, audio signals such as speech or music.

In operation, the hardware audio CODEC 164 may be operable to detect the attachment of an accessory or peripheral to the accessory or peripheral port 166 via one or more signals conveyed to the hardware audio CODEC 164 from, for example, a mechanical switch. Subsequently, the hardware audio CODEC 164 may apply a bias to one or more pins of the accessory or peripheral port 166 and may compare the resulting voltage(s) on the pin(s) to one or more reference voltages. The result(s) of the comparison(s) may be conveyed to the processor 156. The processor 156 may utilize the comparison results to identify an accessory or peripheral attached to the accessory or peripheral port 166. Additionally and/or alternatively, the hardware audio CODEC 164 may sample the resulting voltage(s) on the pin(s) and may convey a digital representation of the sampled voltage(s) to the processor 156. The processor 156 may utilize the voltages to identify or determine a type of accessory or peripheral that is attached to the accessory or peripheral port 166.

Figure 1B:
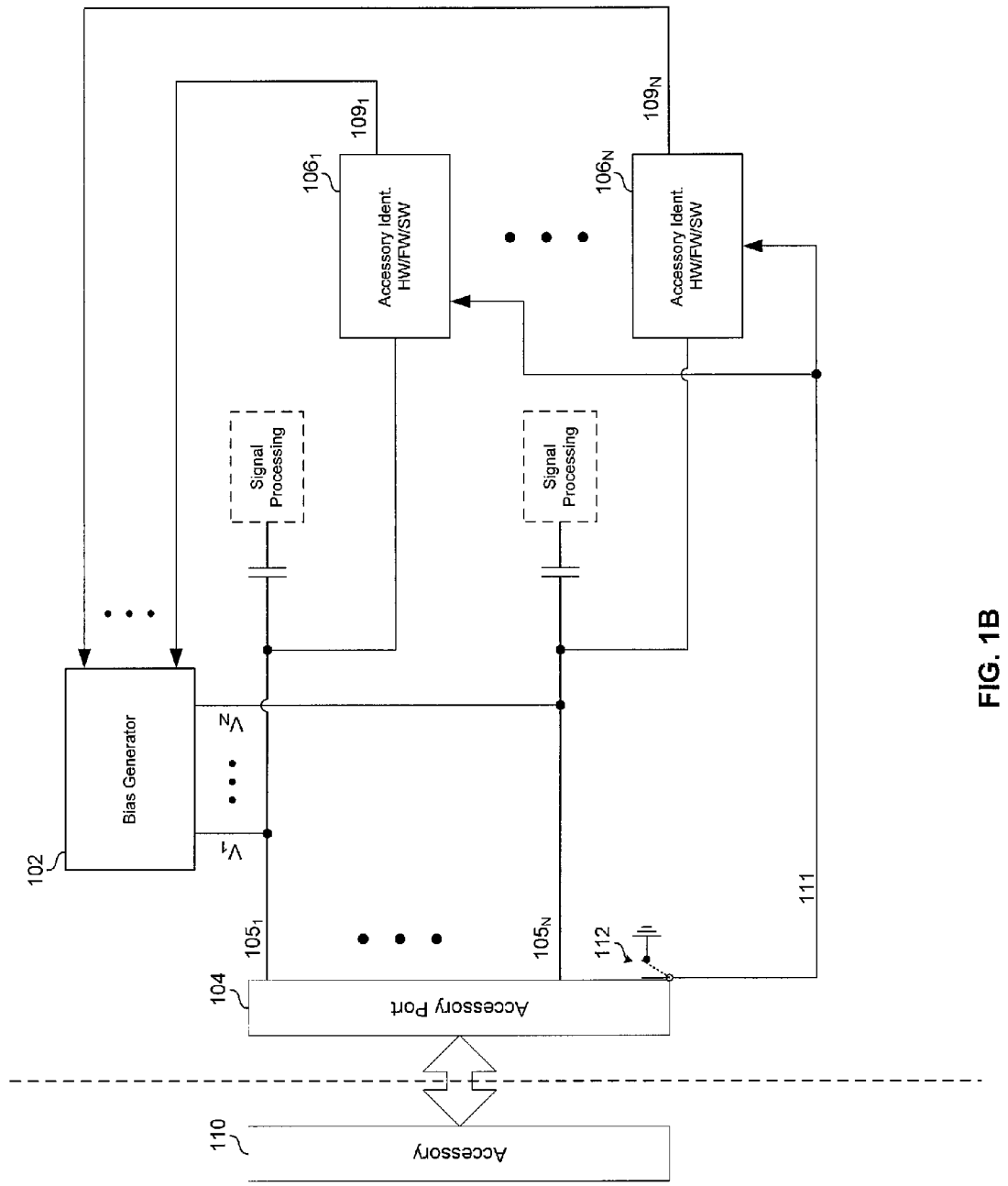
FIG. 1B is a diagram illustrating detection and identification of an attached accessory or peripheral, in accordance with an embodiment of the invention.

FIG. 1B is a diagram illustrating detection and identification of an attached accessory or peripheral, in accordance with an embodiment of the invention. Referring to FIG. 1B, there is shown a bias voltage generator 102, an accessory or peripheral port 104, accessory or peripheral identification modules $106_1, \ldots, 106_N$, and switch 112.

The accessory or peripheral port 104 may comprise a connector which may enable attaching to one or more accessories or peripherals 110. Exemplary accessories or peripherals 110 which may be attached via the accessory or peripheral port 104 may comprise headsets, microphones, keyboards, and storage devices. The accessory or peripheral port 104 may comprise one or more pins which may convey electrical signals to and/or from an attached accessory or peripheral 110. The accessory or peripheral port 104 may be also be referred by a variety of names such as connector, receptacle, and plug.

The conductor(s) $105_1, \ldots, 105_N$ may couple the accessory or peripheral port 104 to the accessory or peripheral identification modules $106_1, \ldots, 106_N$. In this regard, each of the conductors may be electrically coupled to a pin of the accessory or peripheral port 104. Accordingly, power, control signals, and/or data may be conveyed to and/or from an attached accessory or peripheral 110 via the conductors $105_1, \ldots, 105_N$.

The switch 112 may be utilized to detect when an accessory or peripheral 110 has been attached to the accessory or peripheral port 104. In this regard, the switch 112 may be a mechanical switch which may couple the conductor 111 to GND, as indicated by the dashed line, while an accessory or peripheral is attached to the accessory or peripheral port 104.

The bias generator 102 may comprise suitable logic, circuitry, and/or code that may be operable to apply a DC bias to conductors $105_1, \ldots, 105_N$ based on one or more control signals $109_1, \ldots, 109_N$. In an exemplary embodiment of the invention, the bias generator 102 may be operable to generate three bias points 0V, $V_{low}$, and $V_{hi}$. Accordingly, 0V, $V_{low}$, or $V_{hi}$ may be applied to each of the conductors $105_1, \ldots, 105_N$. In various embodiments of the invention, generated bias voltage(s) may be current limited and/or may be applied via a known resistance. In an exemplary embodiment of the invention, $V_{low}$ may be approximately 0.4V and $V_{hi}$ may be approximately 2.1V and the bias may be applied via a 2.2 k ohm resistance. One or more of the conductors $105_1, \ldots, 105_N$ may be coupled and decoupled from the generator 102 via one or more switching elements.

Each of the accessory or peripheral identification modules $106_1, \ldots, 106_N$ may comprise suitable logic, circuitry, and/or code that may be operable to identify an accessory or peripheral attached to the accessory or peripheral port 104. Accordingly, various functions of each accessory or peripheral identification module $106_i$, where 'i' is an integer between 1 and 'N', may be implemented via hardware, firmware, and/or software. In an exemplary embodiment of the invention, each of the accessory or peripheral identification modules $106_1, \ldots, 106_N$ may be implemented via analog HW 206, digital HW 208, and a processor 210 as described below with respect to FIG. 2.

In operation, each of the accessory or peripheral identification modules $106_1, \ldots, 106_N$ may be operable to detect the attachment of an accessory or peripheral via a detected voltage level on the conductor 111. The accessory or peripheral identification modules $106_1, \ldots, 106_N$ may enable, via the signals $109_1, \ldots, 109_N$, the bias generator 102 to apply a bias to the conductors $105_1, \ldots, 105_N$. A resulting voltage on each conductor $105_1, \ldots, 105_N$ may be compared to one or more reference voltages. A result of the comparison(s) may be utilized to identify the accessory or peripheral. In some instances, the results of the comparison(s) may be filtered by the accessory or peripheral identification modules $106_1, \ldots, 106_N$ to remove spurious signals and/or noise. In some instances the comparison(s) may be insufficient to uniquely identify the accessory or peripheral. Accordingly, a voltage on each of the conductors $105_1, \ldots, 105_N$ may also be sampled, converted to digital, and then referenced to a look-up table or other memory element in order to identify the accessory or peripheral. In various embodiments of the invention, a sequence of bias points may be applied to the conductors $105_1, \ldots, 105_N$ and a resulting matrix of comparisons and/or sampled voltages may be utilized to identify the accessory or peripheral.

The conductors $105_1, \ldots, 105_N$ may also convey data which may be generated and/or processed by modules and/or circuitry such as the analog HW 206, the digital HW 208, and the processor 210. "Data," as utilized herein, may refer to any analog and/or digital information including but not limited to voice, Internet data, and/or multimedia content. Multimedia content may comprise audio and/or visual content comprising, video, still images, animated images, and/or textual content. Accordingly, the conductors $105_1, \ldots, 105_N$ may be capacitively coupled to signal processing circuitry to remove the DC bias resulting from the bias generator 102. This may reduce the number of pins required in the accessory or peripheral port and/or enable accessory or peripheral identification in accordance with various embodiments of the invention to be compatible with existing accessory or peripheral ports.

Figure 2:
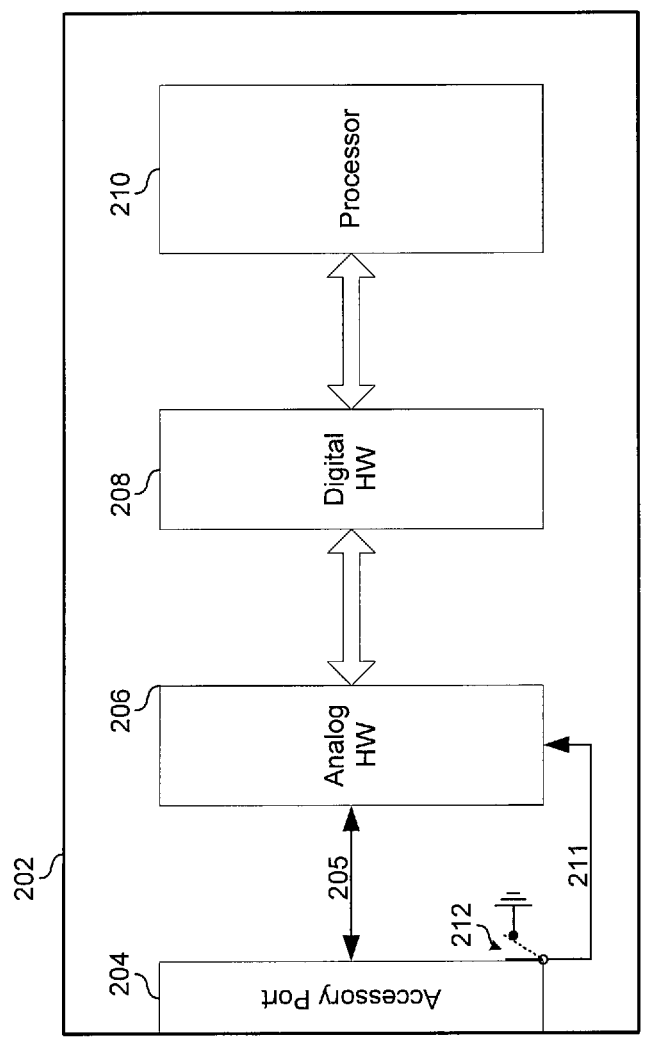
FIG. 2 is a diagram illustrating an exemplary electronic device enabled to interface with a variety of accessories or peripherals via an accessory or peripheral port, in accordance with an embodiment of the invention.

FIG. 2 is a diagram illustrating an exemplary electronic device enabled to interface with a variety of accessories or peripherals via an accessory or peripheral port, in accordance with an embodiment of the invention. Referring to FIG. 2, the device 202 may comprise an accessory or peripheral port 204, analog hardware (HW) 206, digital hardware (HW) 208, a processor 210, a conductor 211, a switch 212, and a signal bus 205. In an exemplary embodiment of the invention, the analog HW 206 and the digital HW 208 may be implemented in the hardware audio CODEC 164.

The accessory or peripheral port 204 may be similar to or the same as the accessory or peripheral port 104 described with respect to FIG. 1B. The switch 212 may be similar to or the same as the switch 112 described with respect to FIG. 1B. The switch 212 may be utilized to detect when an accessory or Peripheral has been attached to the accessory or peripheral port 204. In this regard, the switch 212 may be a mechanical switch which may couple the conductor 211 to GND, as indicated by the dashed line, while an accessory or peripheral is attached to the accessory or peripheral port 204.

The bus 205 may comprise one or more conductors similar to or the same as the conductors $105_1, \ldots, 105_N$ described with respect to FIG. 1B. In this regard, the bus 205 may convey power and/or data between the analog HW 206 and the accessory or peripheral port 204. One or more of the conductors of the bus 205 may be utilized to identify an accessory or peripheral.

The analog HW 206 may comprise logic and/or circuitry that may be operable to bias one or more pins of the port 204, via one or more conductors of the bus 205, and determine resulting voltage levels on the pins. Additionally, the analog HW 206 may be operable to down-convert, demodulate, convert to digital, amplify, and/or otherwise process signals received via the accessory or peripheral port 204. In various embodiments of the invention, the analog HW 206 may be configured via one or more control signals from the digital HW 208 and/or the processor 210.

The digital HW 208 may comprise suitable logic and/or circuitry that may be operable to filter and/or otherwise condition digital signals for conveyance to the processor 210. In various embodiments of the invention, the digital HW 208 may be configured via one or more control signals from the processor 210.

The processor 210 may comprise suitable logic, circuitry, and/or code that may be operable to configure and/or control one or more portions of the device 202, control data transfers between portions of the device 202, and/or otherwise process data. The processor 210 may be operable to identify an accessory or peripheral attached to the accessory or peripheral port 204 based on one or more signals from the digital HW 208. The processor 210 may be any suitable processor or controller. For example, the processor 210 may be a reduced instruction set computing (RISC) microprocessor such as an advanced RISC machine (ARM), advanced virtual RISC (AVR), microprocessor without interlocked pipeline stages (MIPS), or programmable intelligent controller (PIC).

In operation, the analog HW 206 may compare a voltage on one or more conductors of the bus 205 to one or more reference voltages. Results of the comparison(s) may be conveyed to the digital HW 208. The digital HW 208 may filter the result(s) of the comparison(s) and may convey the filtered result(s) to the processor 210. Additionally, the analog HW 206 may convert an analog voltage on one or more conductors of the bus 205 to a digital representation and convey the digital representation to the processor 210. Accordingly, the processor 210 may utilize the comparison results and/or the digital representation of the voltage(s) to identify an accessory or peripheral attached to the accessory or peripheral port 204. In various other embodiments of the invention, the identification may be achieved via logic and/or circuitry within the analog HW 206 and/or digital HW 208. In various embodiments of the invention, two or more of the analog HW 206, the digital HW 208, and the processor 210 may be implemented on a common substrate and may be part of a "system on chip".

Figure 3:
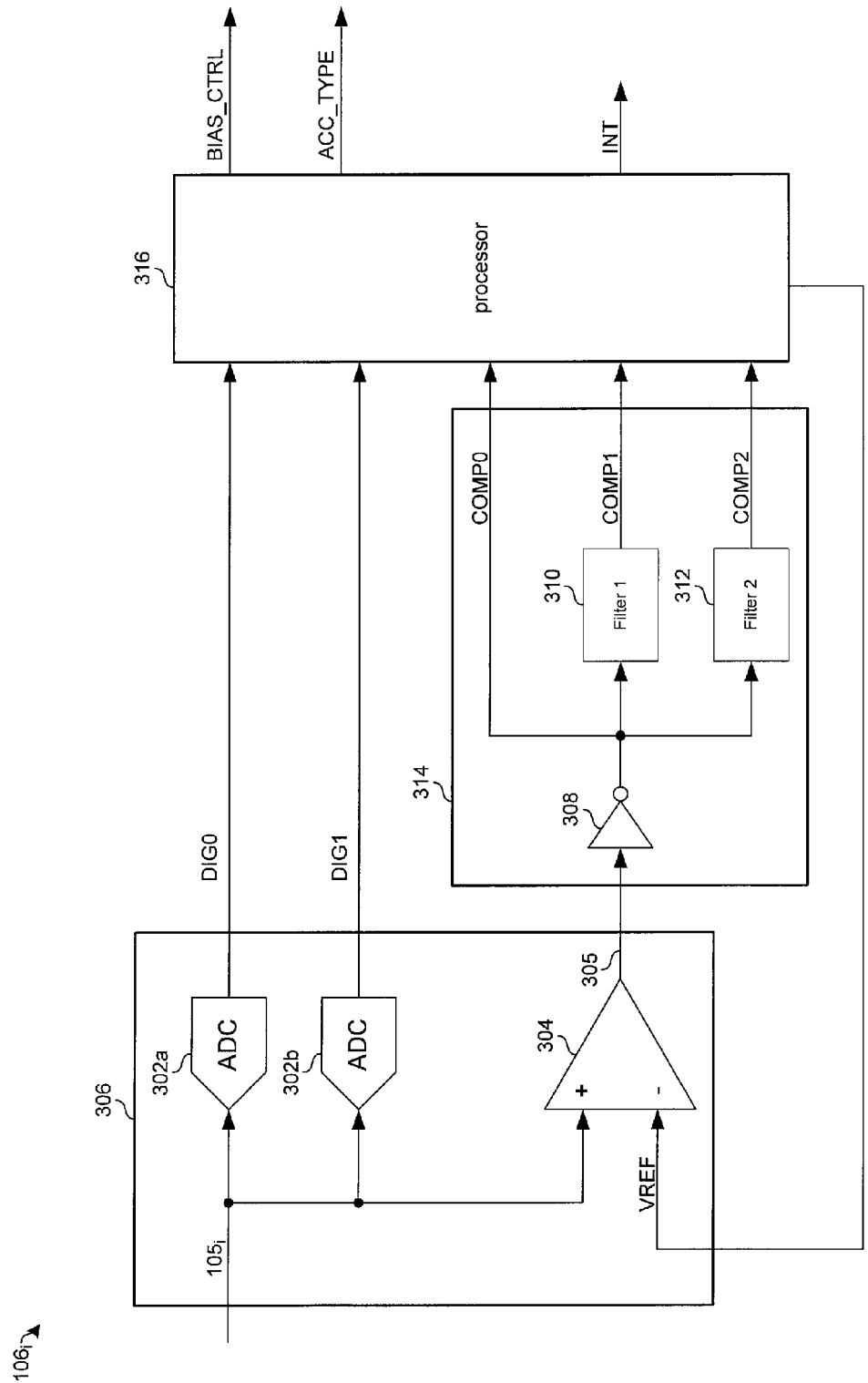
FIG. 3 is a diagram illustrating an exemplary subsystem for identification of an attached accessory or peripheral, in accordance with an embodiment of the invention.

FIG. 3 is a diagram illustrating an exemplary subsystem for identification of an attached accessory or peripheral, in accordance with an embodiment of the invention. Referring to FIG. 3, there is shown an exemplary accessory or peripheral identification module $106_i$ comprising exemplary analog HW 306, exemplary digital HW 314, and an exemplary processor 316. The analog HW 306 may comprise analog to digital convertors (ADCs) 302a and 302b and comparator 304. The digital HW 314 may comprise an inverter 308, a filter 310, and a filter 312. In an exemplary embodiment of the invention, the analog HW 306 and the digital HW 314 may be implemented in the hardware audio CODEC 164 described with respect to FIG. 1A.

Each of the ADCs 302a and 302b may comprise suitable logic, circuitry, and/or code that may enable conversion of analog signals to a digital representation. In this regard, each of the ADCs 302a and 302b may, for example, sample and quantize a voltage on the conductor $105_i$ at times specified by a sampling clock. Accordingly, each of the ADCs 302a and 302b may receive one or more control signals and one or more clock signals. In various embodiments of the invention, the ADCs 302a and 302b may have different resolution and/or different full-scale range. For example, the ADC 302a may be a coarse resolution ADC with large voltage range and the ADC 302b may be a fine resolution ADC with small voltage range.

The comparator 304 may comprise suitable logic and/or circuitry that may be operable to assert the signal 305 when the voltage on conductor $105_i$ is greater than VREF and de-assert the signal 305 when the voltage on conductor $105_i$ is less than VREF. In various embodiments of the invention, VREF may be determined by the processor 316 utilizing, for example, a look-up table. The value of VREF may be configured in real-time. The value of VREF may be configured based on one or more previous determinations, via the comparator 304 and/or the ADCs 302a and 302b, of the voltage on the conductor $105_i$.

The inverter 308 may be operable to invert the digital logic value of the signal 305. In this regard, COMP0 may be de-asserted while the voltage on conductor $105_i$ may be greater than VREF and may be asserted when the voltage on conductor $105_i$ may be less than VREF.

The filters 310 and 312 may each comprise suitable logic and/or circuitry that may be operable to de-bounce or otherwise remove noise from the signal COMP0. In an exemplary embodiment of the invention, the filters 310 and 312 may de-bounce COMP0 to generate COMP1 and COMP2, respectively. In an exemplary embodiment of the invention, the filters 310 and 312 may de-bounce the signal differently and thus COMP1 and COMP2 may exhibit different responses to the same accessory or peripheral.

In operation the comparator 304 may compare the voltage on the conductor $105_i$, $V_{105i}$, to VREF. In instances that $V_{105i}$ may be greater than VREF, the signal 305 may be asserted. Conversely, in instances that $V_{105i}$ may be less than VREF, the signal 305 may be de-asserted. The inverter 308 may invert the signal 305 to generate COMP0. COMP0 may be filtered to generate COMP1 and COMP2. COMP0, COMP1, and COMP2 may be conveyed to the processor 316. Additionally, voltage $V_{105i}$ may be sampled by the ADCs 302a and/or 302b and the resulting digital value(s), DIG0 and/or DIG1, may be conveyed to the processor 316. The processor 316 may identify the accessory or peripheral coupled to conductor 105; based on the value(s) and/or behavior(s) of one or more of COMP0, COMP1, COMP2, DIG0, and DIG1. In this regard, the comparator may be enabled to detect steady state voltages as well as spikes or other transient voltage levels on the conductor $105_i$. The value(s) and/or behavior(s) of COMP0, COMP1, and/or COMP2 may be utilized to obtain a (relatively) quick indication of the type of accessory or peripheral attached. In some instances, COMP0, COMP1, and/or COMP2 may not uniquely identify the type of accessory or peripheral attached and consequently DIG0 and/or DIG1 may be utilized to uniquely identify an accessory or peripheral.

In various embodiments of the invention, a sequence of bias points may be applied to the conductor $105_i$ and a resulting matrix of COMP0, COMP1, COMP2, DIG0, and/or DIG1 values may be utilized to uniquely identify accessory or peripheral type. In various embodiments of the invention, the processor 316 may reference a look-up table which may map accessory or peripheral types to corresponding values and/or behaviors of COMP0, COMP1, COMP2, DIG0, and/or DIG1.

Figure 4:
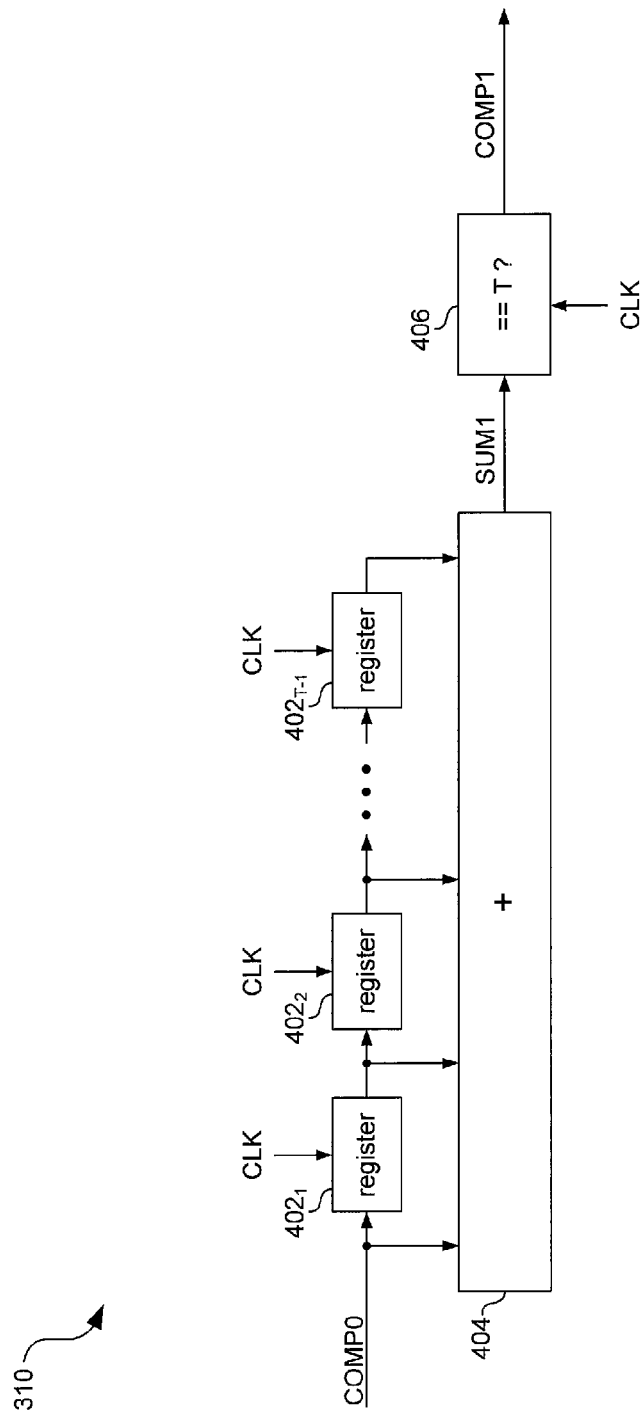
FIG. 4 is a diagram illustrating an exemplary filter for de-bouncing signals, in accordance with an embodiment of the invention.

FIG. 4 is a diagram illustrating an exemplary filter for de-bouncing signals, in accordance with an embodiment of the invention. Referring to FIG. 4, the exemplary filter 310 may comprise a plurality of registers $402_1, \ldots, 402_{T-1}$, an adder 404, and a comparison module 406.

Each of the registers 402 may comprise one or more memory elements such as a flip-flop. A value at the input of each register $402_k$, where 'k' is an integer between 1 and T−1, may be stored and conveyed to an output of the register $402_k$ on each active edge of CLK.

The adder 404 may comprise suitable logic and/or circuitry that may be operable to add the outputs of the registers $402_1, \ldots, 402_{T-1}$. Accordingly, SUM1 generated by the adder 404 may be a value between 0 and 'T'.

The comparison module 406 may comprise suitable logic and/or circuitry that may be operable to compare SUM1 to a value 'T'. In this regard, 'T' may be the number of registers 402 and thus a logic '1' stored in each of the registers $402_1, \ldots, 402_{T-1}$ may result in SUM1 being equal to 'T'. In instances that SUM1 may be equal to 'T', then COMP1 may be asserted. In this manner, COMP1 may be asserted after COMP0 has been logic '1' for 'T' consecutive cycles of CLK.

In operation, COMP0 may be sampled and stored in register $402_1$ on each active edge of CLK. Similarly, the output of each register $402_{t-1}$ may be stored in register $402_t$ on each active edge of CLK, where 't' is an integer between 1 and 'T−1'. Thus, in instances that COMP0 has been logic '1' for 'T' consecutive cycles of CLK, a logic '1' may be stored in all of the registers $402_1, \ldots, 402_{T-1}$. However, when transitioning from logic '0' to logic '1', COMP0 may oscillate, or "bounce", between logic '0' and logic '1' several times before stabilizing. In this regard, 'T' consecutive samples of logic '1' may be unlikely while COMP0 is bouncing. Thus COMP1 may remain de-asserted until COMP0 stabilizes at logic 1. Similarly, in instances that noise or spurious signals may be present on COMP0, it may be unlikely that the noise will cause an erroneous logic '1' for 'T' consecutive samples. In this manner, false assertions of COMP1 may be prevented or at least reduced via the filter 310.

Figure 5:
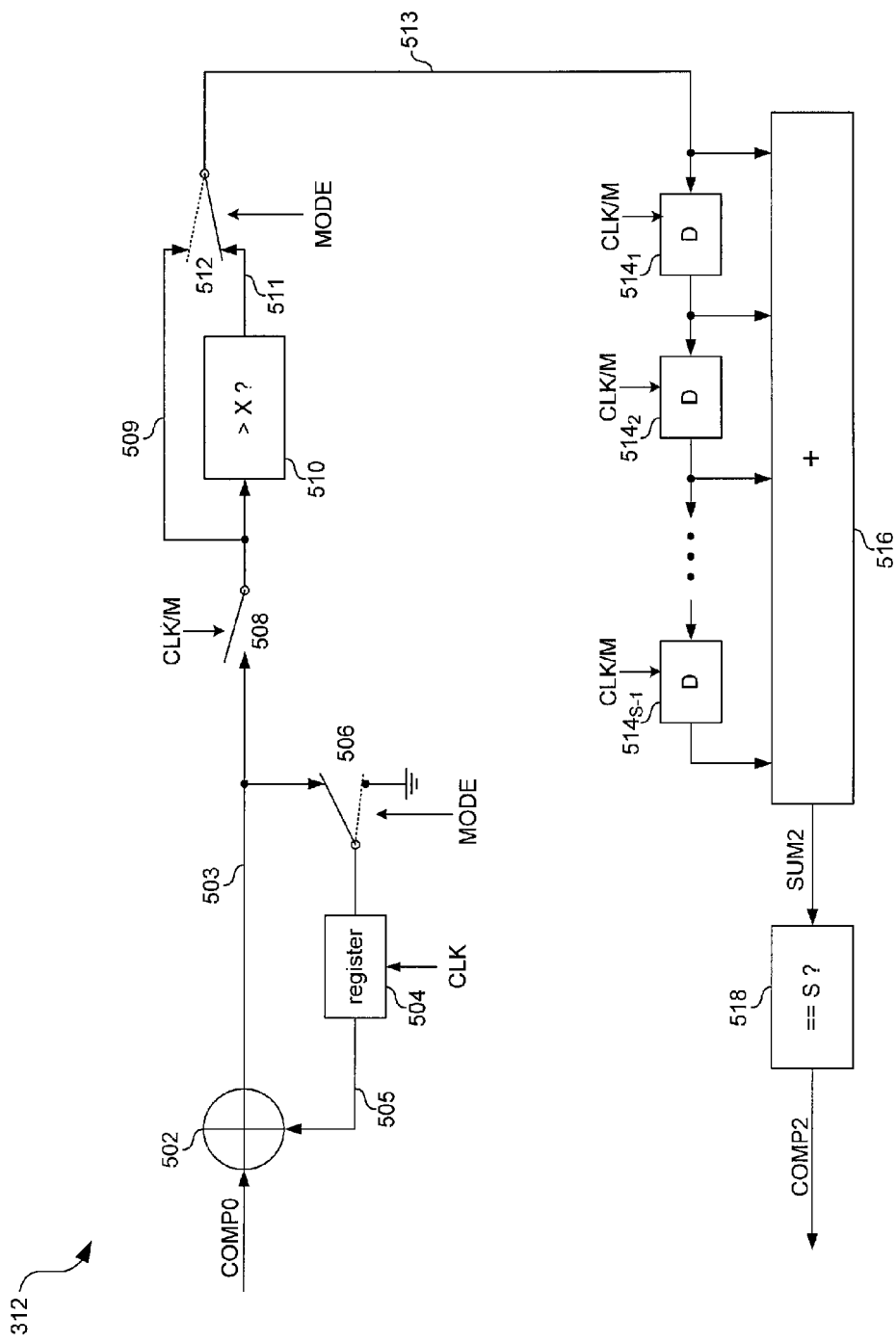
FIG. 5 is a diagram illustrating an exemplary filter for de-bouncing signals, in accordance with an embodiment of the invention.

FIG. 5 is a diagram illustrating an exemplary filter for de-bouncing signals, in accordance with an embodiment of the invention. Referring to FIG. 5 the exemplary filter 312 may comprise an adder 502, a register 504, switch 506, comparison module 510, switch 512, registers $514_1, \ldots, 514_{S-1}$, adder 516, and comparison module 518.

The registers 504 may comprise one or more memory elements. A value at the input of the register 504 may be stored and conveyed as signal 505 of the output of the register on each active edge of CLK.

The adder 502 may comprise suitable logic and/or circuitry that may be operable to sum COMP0 with signal 505. COMP0 may be a 1-bit signal and the output of the register 504 may be multiple bits.

The switch 506 may be operable to couple the input of the register 504 to either GND or the signal 503. The switch 506 may be configured based on a mode of operation of the filter 312. In this regard, position indicated by the dashed line may correspond to a decimate-by-M mode of operation. Conversely, the position indicated by the solid line may correspond to an integrate-and-dump mode of operation. The switch 506 may be configured via one or more control signals from, for example, the processor 316 (FIG. 3).

The switch 508 may be operable to couple the signal 503 to the comparison module 510 on every $M^{th}$ cycle of CLK.

The comparison module 510 may comprise suitable logic and/or circuitry that may be operable to compare signal 503 output by the adder 502 to a value 'X'. For the integrate-and-dump mode of operation, in instances that the signal 503 may be greater than 'X', then the signal 511 may be asserted. In this manner, the signal 511 may be asserted when COMP0 has been logic '1' for 'X' out of 'M' cycles of CLK, where 'M' may be an integer greater than or equal to 1.

The switch 512 may be operable to couple the input of the register $514_1$ to either the signal 509 or the signal 511. The switch 512 may be configured based on a mode of operation of the filter 312. In this regard, position indicated by the dashed line may correspond to a decimate-by-M mode of operation. Conversely, the position indicated by the solid line may correspond to an integrate-and-dump mode of operation. The switch 512 may be configured via one or more control signals from, for example, the processor 316.

Each of the registers $514_1, \ldots, 514_{S-1}$ may comprise one or more memory elements such as a flip-flop. A value at the input of each register $514_k$, where 'k' is an integer between 1 and S−1, may be stored and conveyed to an output of the register $514_k$ every $M^{th}$ active edge of CLK (i.e., CLK/M).

The adder 516 may be similar to or the same as the adder 404 described with respect to FIG. 4. In this regard, the adder 516 may be operable to add the inputs and outputs of the registers $514_1, \ldots, 514_{S-1}$ to generate SUM2.

The comparison module 518 may comprise suitable logic and/or circuitry that may be operable to compare SUM2 to a value 'S'. In this regard, 'S' may be the number of registers 514 and thus a logic '1' stored in each of the registers 514 may result in the SUM2 being equal to 'S'. In instances that the SUM2 may be equal to 'S', then COMP2 may be asserted. In this manner, COMP2 may be asserted after the signal 513 has been logic '1' for 'S' consecutive cycles of CLK/M.

In the decimate-by-M mode of operation, every $M^{th}$ sample of COMP0 may be stored in the register $514_1$. Furthermore, every $M^{th}$ cycle of CLK, the output of register $514_{s-1}$ may be stored and output by register $514_s$, where 's' may be an integer between 1 and 'S−1'. Thus, in instances that 'S' consecutive samples of signal 513 are logic '1', a logic '1' may be stored in all of the registers $514_1, \ldots, 514_{S-1}$ and SUM2 may be equal to 'S'. In instances that SUM2 may be equal to 'S', COMP2 may be asserted.

In the integrate-and-dump mode of operation, COMP0 may be added to the value stored in the register 504 on each active edge of CLK. Every $M^{th}$ cycle of CLK, the accumulated value stored in the register 504 may be input to the comparison module 510. The comparison module 510 may compare the accumulated value from the register 504 with 'X'. In instances that the accumulated value in the register 504 may be greater than 'X', the signal 511 may be asserted. The signal 511 may be stored into the register $514_1$ every $M^{th}$ cycle of CLK. Furthermore, every $M^{th}$ cycle of CLK, the output of register $514_{s-1}$ may be stored and output by register $514_s$, where 's' may be an integer between 1 and 'S−1'. Thus, in instances that 'S' consecutive samples of the signal 511 are logic '1', all of the registers $514_1, \ldots, 514_{S-1}$ may output a logic '1' and SUM2 may be equal to 'S'. In instances that SUM2 may be equal to 'S', COMP2 may be asserted.

Figure 6:
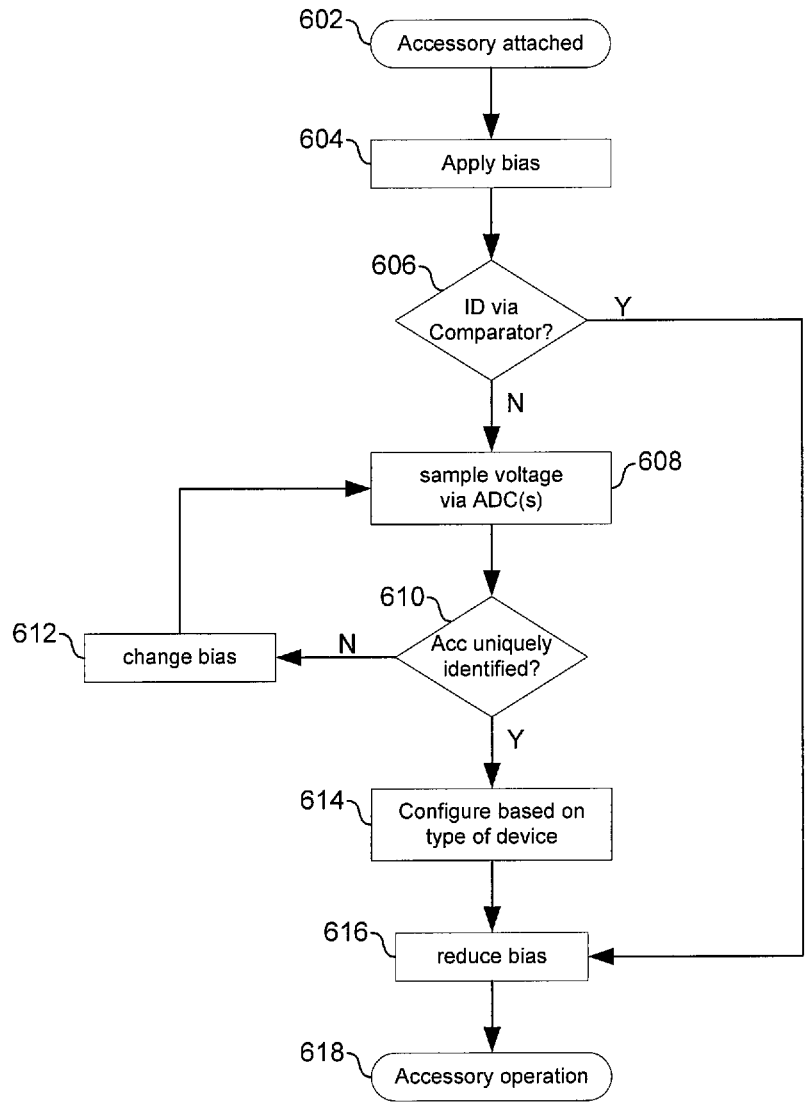
FIG. 6 is a flow chart illustrating exemplary steps for identification of an attached accessory or peripheral, in accordance with an embodiment of the invention.

FIG. 6 is a flow chart illustrating exemplary steps for identification of an attached accessory or peripheral, in accordance with an embodiment of the invention. Referring to FIG. 6, the exemplary steps may begin with step 602 when it may be detected that an accessory or peripheral has been attached to an electronic device such as the device 150 (FIG. 1A). For example, a mechanical switch, such as the switch 112 (FIG. 1B), may be utilized to detect attachment of an accessory or peripheral. Subsequent to step 602, the exemplary steps may advance to step 604.

In step 604, a bias may be applied, via one or more generators such as the bias generator 102 (FIG. 1B), to one or more conductors electrically coupled to the attached accessory or peripheral, such as the conductors $105_1, \ldots, 105_N$. The bias may result in voltages $V_{1051}, \ldots, V_{105N}$, respectively, on the conductors $105_1, \ldots, 105_N$. Subsequent to step 604, the exemplary steps may advance to step 606.

In step 606, the accessory or peripheral identification module may attempt to identify the accessory or peripheral by comparing, via one or more comparators, the voltages $V_{1051}, \ldots, V_{105N}$ to one or more reference voltages. In instances that the output(s) of the comparator(s) may be insufficient to identify the accessory or peripheral, the exemplary steps may advance to step 608.

In step 608, the voltages $V_{1051}, \ldots, V_{105N}$ may be sampled and converted to a digital representation via one or more ADCs such as the ADCs 302a and 302b (FIG. 3). Subsequent to step 608, the exemplary steps may advance to step 610.

In step 610, it may be determined whether the accessory or peripheral may be uniquely identified based on the comparison of step 606 and the sampled voltages from step 608. In instances that the accessory or peripheral may not be uniquely identified based on the combination of the comparator output(s) and the ADC output(s), the exemplary steps may advance to step 612.

In step 612, the bias applied to one or more of the conductors may be changed. Subsequent to step 612, the exemplary steps may return to the previously described step 608.

Returning to step 610, in instances that the accessory or peripheral may be uniquely identified, the exemplary steps may advance to step 614.

In step 614, the electronic device may be configured based on the attached accessory or peripheral. For example, a speaker internal to the device may be muted when an accessory or peripheral is identified as an earpiece. Subsequent to step 614, the exemplary steps may advance to step 616.

In step 616, the bias applied to one or more of the conductors may be reduced. In this regard, aspects of the invention may enable reducing the bias in order to lower power consumption. However, a minimum bias may be maintained to, for example, enable detection of interrupts generated by the accessory or peripheral. Subsequent to step 616, the exemplary steps may advance to step 618.

In step 618, the electronic device may begin operating utilizing the functions enabled by the identified accessory or peripheral.

Returning to step 606, in instances that the output(s) of the comparator(s) may be sufficient to determine the type of accessory or peripheral, the exemplary steps may advance to previously described step 616.

Exemplary aspects of a method and system for detecting and identifying electronic accessories or peripherals are provided. In an exemplary embodiment of the invention, a hardware audio CODEC 164 (FIG. 1A) may be operable to compare one or more voltages on one or more biased pins of an accessory or peripheral port 104 (FIG. 1B) to one or more reference voltages. The hardware audio CODEC 164 may generate one or more digital representations of the one or more voltages on the one or more biased pins. An accessory or peripheral 110 (FIG. 1B) attached to the accessory or peripheral port may be identified based on the comparison and/or the generated one or more digital representations. The comparison and generation of a digital representation may be performed for a sequence of bias points. One or more bias voltages may be applied to the one or more pins via one or more resistances. The one or more bias voltages may be controlled via one or more signals 109 (FIG. 1B) based on results of the comparison COMP0, COMP1, and/or COMP2 (FIG. 3) and/or the generated digital representations DIG0 and/or DIG1 (FIG. 3). The one or more bias voltages may be reduced after an attached accessory or peripheral 110 (FIG. 1B) has been identified. The one or more bias voltages may be set to approximately 2.1 V prior and/or during the identification of an attached accessory or peripheral and approximately 0.4 V subsequent to identification of an attached accessory or peripheral. The one or more bias voltages may be disabled in instances that there may be no accessory or peripheral attached to the accessory or peripheral port 104 (FIG. 1B). A first range of voltages may be converted to a digital representation via a first portion 302a (FIG. 3) of a plurality of analog to digital converters and a second range of voltages may be converted to a digital representation via a second portion 302b (FIG. 3) of the plurality of analog to digital converters. Higher resolution digital representations may be generated via a first portion 302a (FIG. 3) of a plurality of analog to digital converters and lower resolution digital representations may be generated via a second portion 302b (FIG. 3) of the plurality of analog to digital converters.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for detecting and identifying electronic accessories or peripherals.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing signals, the method comprising:
   generating, using a circuit in an audio CODEC, a resulting voltage from a first bias voltage applied to a pin of an accessory or peripheral port;
   comparing, using the circuit, the resulting voltage to reference voltages;
   identifying, using the circuit, an accessory or peripheral coupled to the accessory or peripheral port based on the comparing;
   reducing, using the circuit, the first bias voltage to a second bias voltage subsequent to the identifying; and
   reducing, using the circuit, the first bias voltage or the second bias voltage to a third bias voltage in response to the accessory or peripheral being decoupled from the accessory or peripheral port.

2. The method according to claim 1, wherein controlling the first bias voltage is based on a result of the comparing.

3. The method according to claim 1, further comprising:
   generating, via the circuit in audio CODEC, a digital representation of the resulting voltage; and
   controlling the first bias voltage based on the generated digital representation.

4. The method according to claim 1, further comprising:
   generating, using a bias generator, approximately 2.1 V for the first bias voltage applied during the identifying; and
   generating, using the bias generator, approximately 0.4V for the second bias voltage applied subsequent to the identifying.

5. The method according to claim 1, further comprising generating, using the bias generator, approximately 0V for the third bias voltage during instances that no accessory or peripheral is coupled to the accessory or peripheral port.

6. The method according to claim 1, further comprising:
   converting a first range of resulting voltages to a first digital representation via a first portion of a plurality of analog to digital converters in the audio CODEC, and
   converting a second range of resulting voltages to a second digital representation via a second portion of the plurality of analog to digital converters in the audio CODEC.

7. The method according to claim 6, further comprising:
   generating at a first resolution a first digital representation via a first portion of a plurality of analog to digital converters in the audio CODEC; and generating at a second resolution a second digital representation via a second portion of the plurality of analog to digital converters in the audio CODEC,
wherein the first resolution is higher than the second resolution.

8. The method according to claim 1, wherein the first and second bias voltages are DC bias voltages.

9. The method according to claim 1, further comprising generating, using the circuit, resulting voltages from a sequence of bias voltages applied to the pin of the accessory or peripheral port.

10. A system for processing signals, the system comprising:
a circuit configured to be used in an audio CODEC, the circuit comprising:
an accessory or peripheral port comprising a pin, wherein the circuit is configured to generate a resulting voltage from a first bias voltage applied to the pin;
a comparator configured to compare the resulting voltage to reference voltages;
a processor configured to identify an accessory or peripheral coupled to the accessory or peripheral port based on an output of the comparator; and
a bias generator configured to:
reduce the first bias voltage to a second bias voltage subsequent to identifying the accessory or peripheral coupled to the accessory or peripheral port; and
reduce the first bias voltage or the second bias voltage to a third bias voltage in response to the accessory or peripheral being decoupled from the accessory or peripheral port.

11. The system according to claim 10, wherein the circuit is configured to generate resulting voltages for each of a sequence of bias voltages applied to the pin of the accessory or peripheral port.

12. The system according to claim 10, wherein the circuit further comprises a resistance, wherein the first bias voltage and the second bias voltage is applied to the pin through the resistance.

13. The system according to claim 10, wherein the first voltage is controlled based on the output of the comparator.

14. The system according to claim 10, wherein the circuit is configured to:
generate a digital representation of the resulting voltage; and
control the first bias voltage based on the generated digital representation.

15. The system according to claim 10, wherein the bias generator is configured to:
generate approximately 2.1V for the first bias voltage; and
generate approximately 0.4V for the second bias voltage.

16. The system according to claim 10, wherein the bias generator is configured to generate approximately 0V during instances that no accessory or peripheral is coupled to the accessory or peripheral port.

17. The system according to claim 10, wherein the circuit further comprises a plurality of analog to digital converters, each of the plurality of analog to digital converters being configured to generate the digital representation of the resulting voltage.

18. The system according to claim 17, wherein:
a first portion of the plurality of analog to digital converters is configured to convert a first range of resulting voltages to a first digital representation; and
a second portion of the plurality of the analog to digital converters is configured to convert a second range of resulting voltages to a second digital representation.

19. The system according to claim 17, wherein:
the first portion of the plurality of analog to digital converters is configured to generate a first resolution digital representation; and
the second portion of the plurality of the analog to digital converters is configured to generate a second resolution digital representation such that the first resolution is higher than the second resolution.

* * * * *

UNITED STATES PATENT AND TRADEMARK OFFICE
CERTIFICATE OF CORRECTION

PATENT NO. : 8,452,428 B2
APPLICATION NO. : 12/268305
DATED : May 28, 2013
INVENTOR(S) : Kong et al.

Page 1 of 1

It is certified that error appears in the above-identified patent and that said Letters Patent is hereby corrected as shown below:

In the Claims:

Column 15, line 32, please change "for each of" to --for--.

Signed and Sealed this
Twenty-third Day of July, 2013

Teresa Stanek Rea
*Acting Director of the United States Patent and Trademark Office*